Aug. 14, 1923.
B. R. BENJAMIN ET AL
1,464,740
MOTOR BINDER
Filed Nov. 6, 1919
3 Sheets-Sheet 2
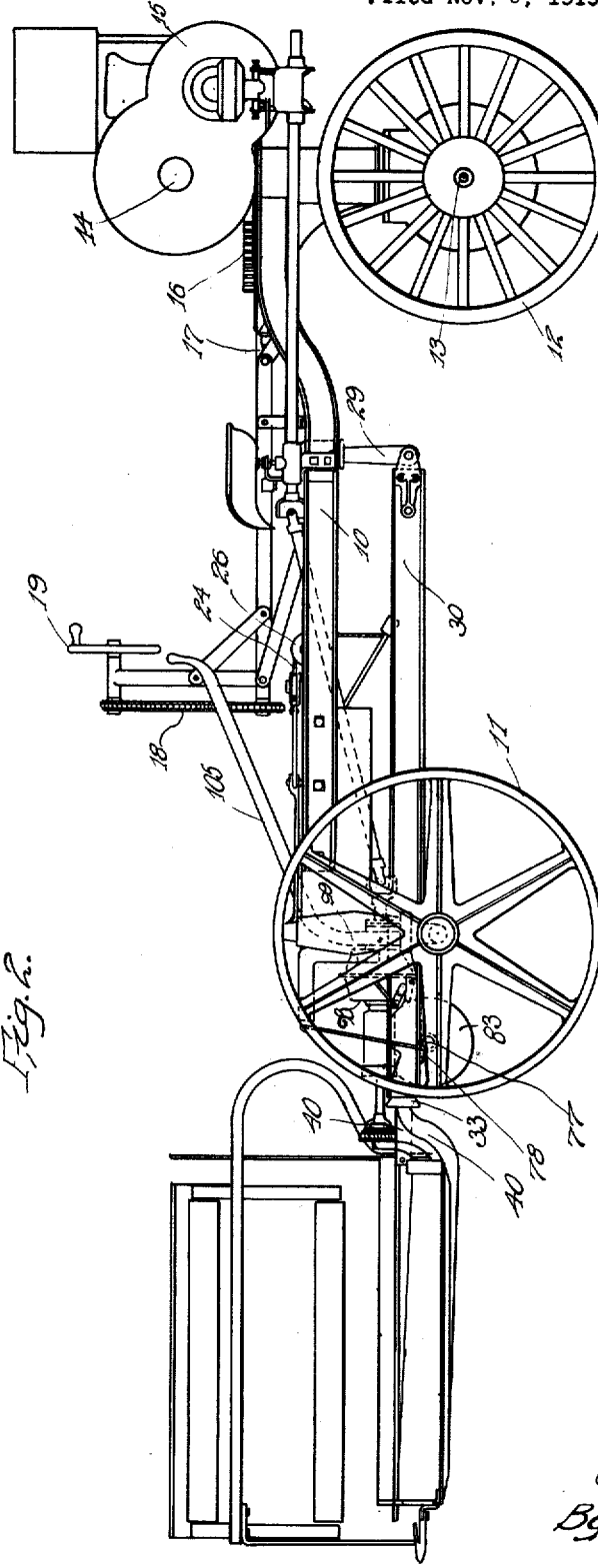
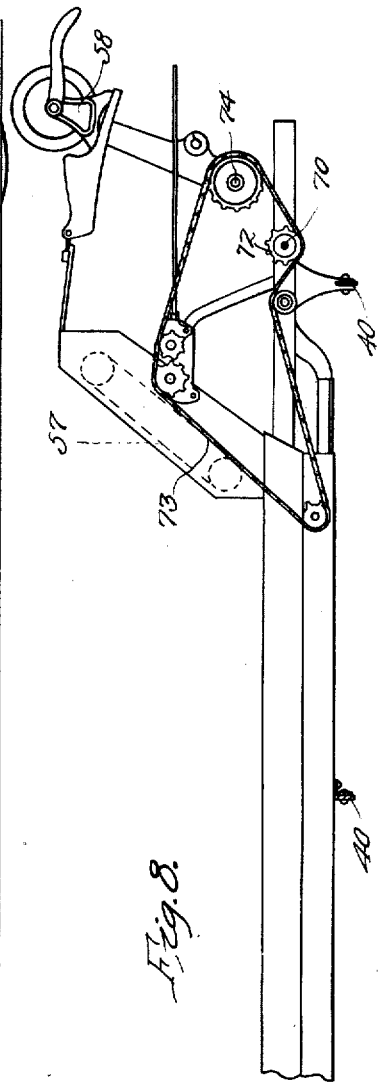
Inventors:
Bert R. Benjamin,
William Webber,
and Charles Pearson.
By John P. Smith.
Atty.

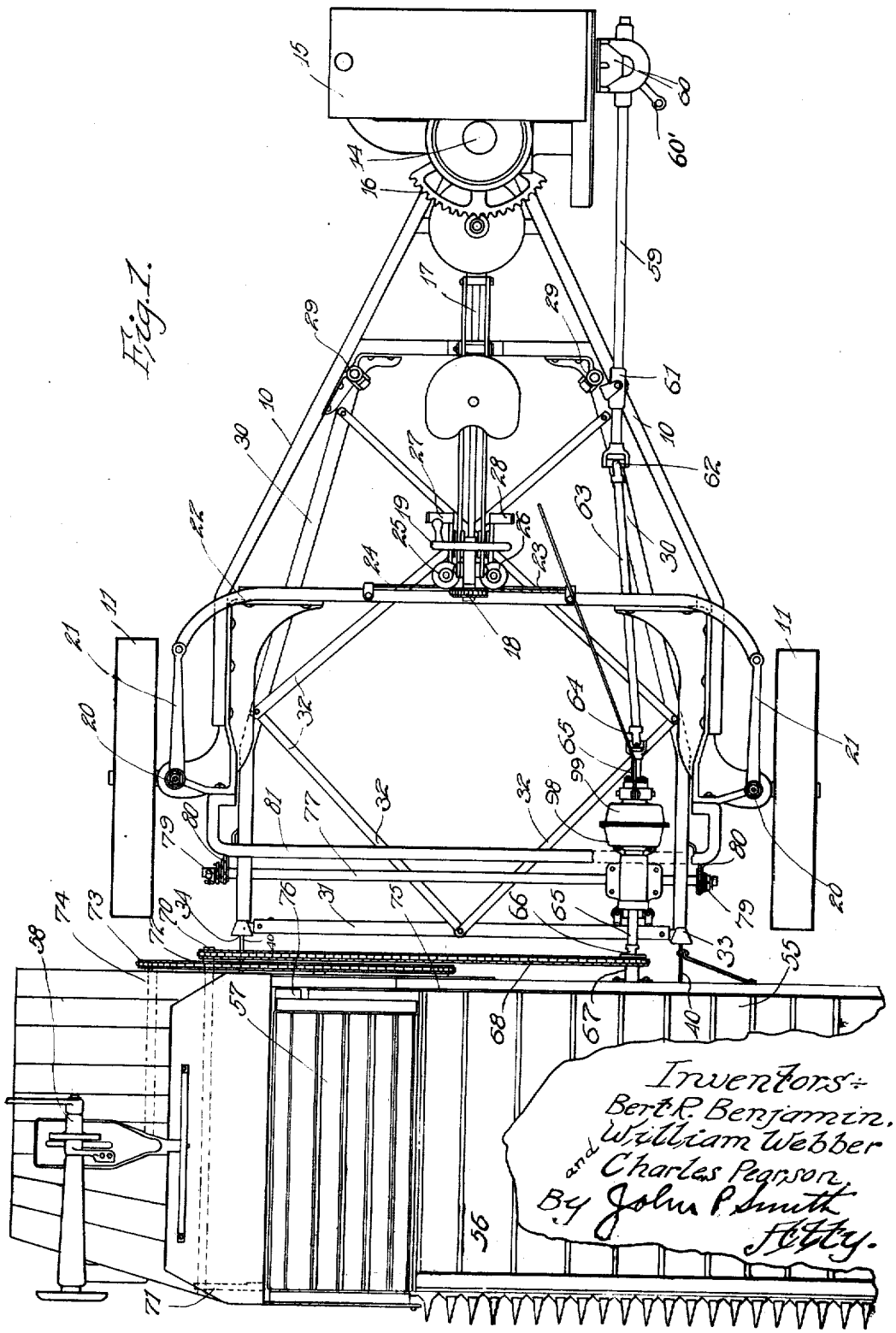

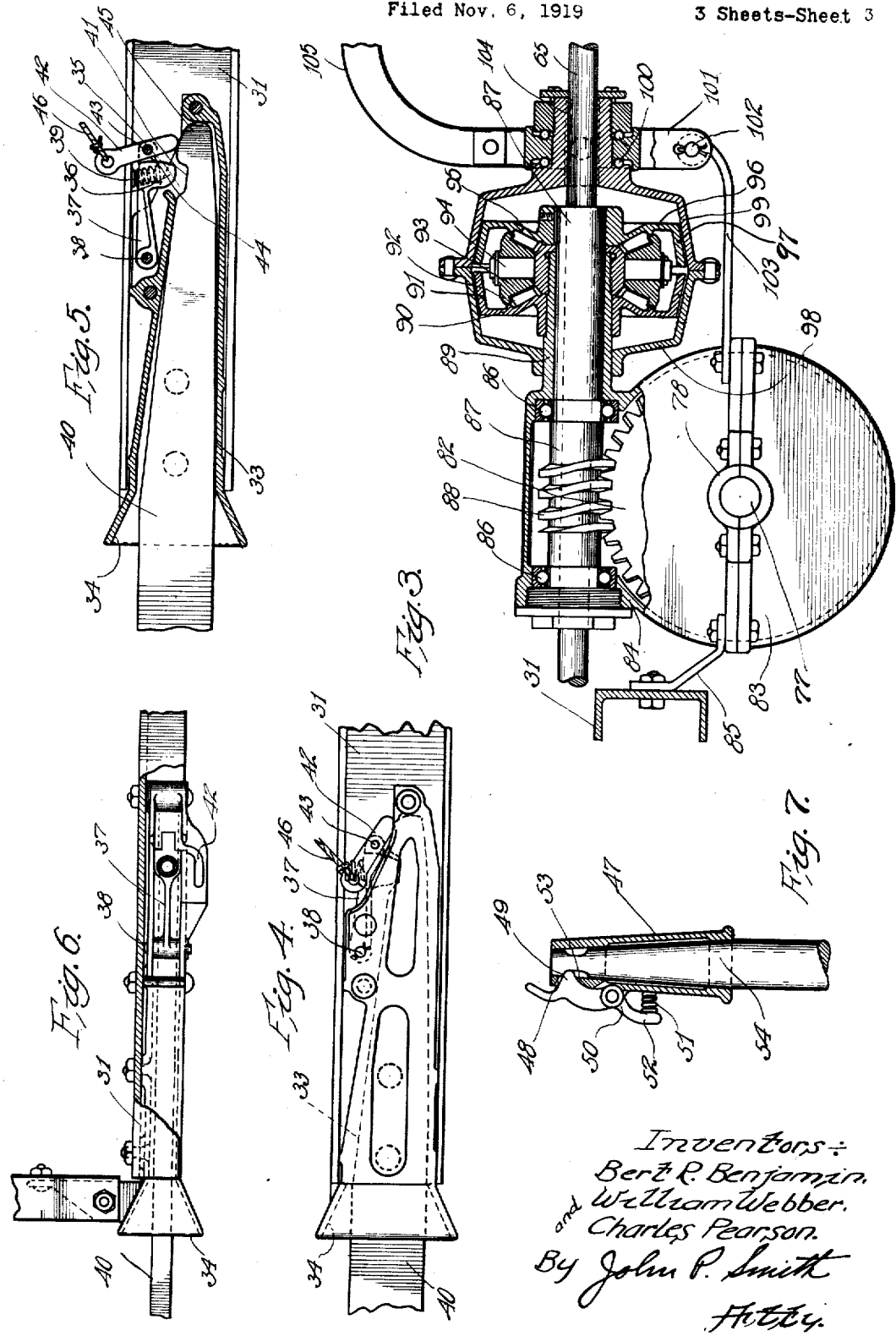

Patented Aug. 14, 1923.

1,464,740

UNITED STATES PATENT OFFICE.

BERT R. BENJAMIN, OF OAK PARK, WILLIAM WEBBER, OF LA GRANGE, AND CHARLES PEARSON, OF CHICAGO, ILLINOIS, ASSIGNORS TO INTERNATIONAL HARVESTER COMPANY, A CORPORATION OF NEW JERSEY.

MOTOR BINDER.

Application filed November 6, 1919. Serial No. 336,089.

*To all whom it may concern:*

Be it known that we, BERT R. BENJAMIN, WILLIAM WEBBER, and CHARLES PEARSON, citizens of the United States, residing at Oak Park, La Grange, and Chicago, respectively, in the county of Cook, county of Cook, and county of Cook, respectively, and State of Illinois, have invented certain new and useful Improvements in Motor Binders, of which the following is a full, clear, and exact specification.

This invention relates to agricultural implements, and more particularly to implement attachments for motor propelled vehicles or tractors.

The object of the invention is to adapt implements of the character described for tractor propulsion and operation; to lighten the construction of the implement by supporting the implement frame on the frame of the tractor; to provide a coupling connection between the implement and the tractor whereby the implement may be connected to the tractor and be disconnected therefrom with a minimum expediture of time and labor; to provide power transmission mechanism by means of which the power from the tractor may be utilized to drive the operative elements on the implement; and to raise and lower the implement with respect to the ground.

With these objects in view, the invention consists briefly of a tractor frame having in this instance forwardly extending frame members and an implement which in this instance is illustrated as a grain binder having rearwardly extending frame members adapted to be detachably engaged by the forwardly extending frame members of the tractor. The forwardly extending frame members of the tractor which support the implement frame are hingedly mounted on the main tractor frame and means is provided for vertically adjusting this hinged frame by means of power derived from the tractor engine. The source of power on the tractor is also utilized to drive the operative elements on the implement, or, in this instance, on the harvester frame, and in the embodiment of the invention illustrated, the same power transmission shaft is utilized for driving the operative elements on the harvester and for raising and lowering the hinged supporting frame on the tractor.

We have illustrated one embodiment of the invention in the drawings, and in these drawings—

Fig. 1 is a top plan view illustrating the improved implement tractor combination;

Fig. 2 is a side elevation of the construction shown in Fig. 1;

Fig. 3 is an enlarged elevational view, partly in section, illustrating the power transmission mechanism;

Fig. 4 is a side elevational view illustrating the detachable coupling mechanism which is adapted to connect the implement supporting members with the hinged frame on the tractor;

Fig. 5 is a longitudinal sectional view of the construction shown in Fig. 4;

Fig. 6 is a top plan view, partly in section, of the construction shown in Fig. 4;

Fig. 7 is a detail view, partly in section, showing a modified form of latching mechanism; and Fig. 8 is a detail view showing in end elevation the driving connections for the operative elements of the harvester.

In the embodiment of the invention illustrated in the drawings, there is shown a harvester machine or grain binder, but it should be understood that the particular form of implement shown has been chosen merely for the purpose of illustration, and that the invention is equally well adapted for use in connection with other implements. The tractor in connection with which the invention is illustrated comprises a substantially triangularly shaped frame having longitudinal frame members 10, the frame being supported at its front end by wheels 11, and at its rear end by traction wheel 12. The wheel 12 is mounted on a horizontal axle 13 which in turn is carried by a vertical pivot axle 14, the wheel 12 thereby being swiveled with respect to the frame. An engine 15 is carried by the frame at the rear end thereof, this engine being preferably of the internal combustion type. As clearly illustrated in Figs. 1 and 2, the engine is supported substantially over the traction wheel 12, and the weight of the engine thereby gives added traction to the wheel. A toothed sector 16 is connected to the vertical pivot axle 14, and this sector is rotated in any suitable manner by a shaft 17 which is connected by means of a chain 18 to a steering wheel 19. The steering mechanism forms no part of the present invention, and the details of the construction, therefore, have not been fully illustrated. The front wheels 11 serve also as steering wheels, these wheels being carried by vertical pivot axles 20 having rearwardly extending crank arms 21 which are connected by a curved link 22 slidably supported on the tractor frame. The link 22 has secured thereto intermediate its ends cables 23 and 24 which pass around the guide pulleys 25 and 26 and are secured at their opposite ends to foot treadles 27 and 28. As the operator presses on the foot treadles 27 or 28 the link 22 is moved transversely to the right or to the left, as the case may be, and the vertical pivot axles are angled, thereby angling the wheels.

Having described briefly the frame construction of the tractor, we will next describe the hinged frame which is adapted to support the implement, and also the improved means for detachably connecting the implement supporting members to the front of the hinged frame.

The frame members 10 of the tractor have secured thereto vertically disposed standards 29, to which are hingedly connected at their rear ends frame members 30 which are preferably formed of channel iron. The frame members 30 are connected at their front ends by transverse frame member 31 and are also connected and braced by diagonal bracing members 32. At their front ends the members 30 have secured thereto forwardly opening socket members 33 which are flared at their front ends, as shown at 34. The construction of these socket members is clearly illustrated in Figs. 4, 5 and 6, and as will be seen, the members are secured in place between the flanges of the channel iron frame members 30. Members 33 are tapered longitudinally and adjacent their rear ends are provided with openings 35 through which a portion 36 of the spring pressed latching member is adapted to project. The member 37 is pivoted at 38 on the socket member and is normally forced downwardly by means of a spring 39 which engages one of the flanges of the frame member 30 at one end, and engages the portion 36 of the latch at the opposite end. These socket members are adapted to receive the rearwardly extending tapered ends of supporting members 40, the members 40 forming the main support for the implement carried thereby. Each of the supporting members 40 is tapered to correspond with the taper of the socket members and adjacent its rear end is provided with a recess 41 adapted to be engaged by the portion 36 of the latch 37. From the illustration in Fig. 5, it will be readily seen that as the supporting member 40 passes into the socket member 33, the latch will automatically spring into place in the recess when the supporting member has been forced to the rear end of the socket. Means is also provided for releasing the supporting member from the socket, this means comprising a pivoted lever 42 which is pivotally connected at 43 to an extension 44 formed on the latch 37. The lower end of the lever 42 is adapted to engage the rear end 45 of the supporting member 40 and to lift the latch 37 out of engagement with the recess 41. A flexible operating cord or wire 46 is secured to the upper end of the lever 42 and may be carried to a position adjacent the seat of the tractor operator.

In Fig. 7 a modified form of latching means is illustrated, this means comprising a socket member 47 similar to the socket 33, the socket member 47 having an opening 48 at its rear end through which projects a portion 49 of a pivoted latch 50. The portion 49 is normally pressed into the opening 48 by means of a spring 51 interposed between a portion 52 of the latch and the socket member 47. The portion 49 of the latch engages a recessed portion 53 of a supporting member 54, thereby retaining the supporting member in the socket.

The harvester in connection with which our invention is illustrated is provided with the usual platform apron 55, reciprocating cutting apparatus 56, elevating conveyors 57 and binding mechanism 58. This construction has not been illustrated in detail, since per se it forms no part of the present invention.

The power transmission mechanism by means of which the source of power on the tractor is operatively connected to the operative elements of the harvester, and also by means of which this same source of power is utilized to raise and lower the hinged frame 30 will next be described.

Referring particularly to Fig. 1 it will be seen that the main power transmission shaft 59 is geared to the engine 15 by means of suitable gearing 60 controlled by the clutch lever 60', shaft 59 being rotatably mounted in bearings 61 carried by the frame 10 of the tractor. At its front end, shaft 59 is connected by universal coupling 62 to a shaft 63, which in turn is connected by a universal coupling 64 to a shaft 65. In the embodiment of the invention illustrated, the shaft 65 is continuously operated, when the clutch lever 60' is in clutch engaging position, and projects forwardly from the tractor frame, the front end of the shaft being connected by a suitable coupling 66 to a shaft 67 supported on the implement frame. The shaft 67 is connected by a sprocket and chain connection 68 to a shaft 70 which is connected at its opposite end by a pitman 71 to the cutting apparatus 56. The shaft 70 is also provided with a sprocket 72 which in turn is operatively connected by a chain 73 with the shaft 74 which drives the packers for the binding mechanism and is in turn connected to the knotting mechanism of the binder in the usual manner. The chain 73 also drives the delivery roller 75 for the platform apron 55, and is also connected by suitable gearing to the elevator driving roller 76. As above stated, the drive shaft 65 is continuously operated, but suitable driving connections are provided between this drive shaft and the raising and lowering mechanism for the hinged frame 30 whereby the hinged frame may be raised or lowered, at will, by the operator and through power derived from the shaft 65. The power transmission mechanism between the shaft 65 and the raising and lowering mechanism is supported at its front end on the transverse member 31 and is also supported on a transverse shaft 77 which is journaled in suitable bearings 78 carried by the frame members 30. As illustrated in Fig. 1, the shaft 77 extends outwardly beyond its bearings, the outer ends of the shaft having secured thereto chains 79 which are secured at their opposite ends as shown at 80 to a forwardly extending frame member 81 carried by the tractor frame. The upper ends of these chains which are connected to the frame 81, being rigidly held, it will be seen that if the shaft 77 is rotated in a manner to wind up the chain, the shaft and the hinged frame 30 by which the shaft is carried will be necessarily raised.

Means for rotating the shaft 77 in a manner to wind up or unwind the chains will next be described. Shaft 77 has secured thereto a worm wheel 82 which is enclosed by a two-part casing 83—84. The casing is rigidly secured by a bracket 85 to the transverse frame member 31 as illustrated in Fig. 3. The upper portion 84 of the casing has journaled therein in ball bearings 86, a sleeve 87 which carries a worm 88 adapted to mesh with the worm wheel 82. The casing 84 is also provided with a rearwardly extending projecting portion 89 which forms a bearing for the sleeve 87 and also has rotatably mounted thereon a power transmission member 90 having a flange 91 disposed adjacent its outer periphery and having a bevel gear portion 92 adapted to be driven by bevel gear 93 supported on a spindle 94. The gear 93 is adapted to be driven by a gear portion 95 of a transmission member 96 similar to the transmission member 90, and having a peripheral flange 97. The transmission member 96 is keyed to the rear end of the sleeve 87 and is adapted to transmit power thereto.

The transmission mechanism just described is surrounded by a two-part casing 98—99 which is rotatably mounted at its front end on the rear extension 89 of the casing 84 and is supported at its rear end in ball bearings 100 carried by a lever 101 which is pivoted at 102 to a frame extension 103 carried by the gear casing 83—84. As shown in Fig. 3, the casing 98—99 is provided with inclined bearing portions which are adapted to engage the flanges 91—97 when the casing is shifted longitudinally on the extension 89 of the casing 84. The casing 98—99 is splined, as shown at 104, to the shaft 65 and is driven thereby. The lever 101 is extended rearwardly, as shown at 105, to a position adjacent the seat of the operator on the tractor in order to enable the operator to shift the casing 98—99 and thereby rotate the shaft 77 in either direction.

In order that the operation of the power transmission mechanism, just described, may be clear, a brief outline of its operation will be given. The shaft 65 is the main drive shaft and rotates the two-part casing 98—99. When the operator desires to vertically adjust the frame in one direction, the lever 105 will be forced forwardly, thereby shifting the two-part casing to a position in which the portion 99 of the casing will engage the flange 97 of the power transmission member 96. As the power transmission member 96 is keyed to the sleeve 87, the rotation of the member 96 will also rotate the sleeve 87, worm 88, worm wheel 82, and shaft 77. If the operator desires to vertically adjust the hinged frame in the opposite direction, the lever 105 will be pulled rearwardly, thereby forcing the portion 98 of the two-part casing in engagement with the flange 91 of the transmission member 90, thereby rotating the bevel gear 93 through its engagement with the bevel gear 92 and the bevel gear 93 will in turn rotate the bevel gear portion 95 of the transmission member 96 in a direction opposite to that in which the transmission member 96 was formerly rotated. This will cause the sleeve 87 to rotate in the opposite direction, thereby rotating the shaft 77 in a direction opposite to that in which it formerly rotated.

It is believed that this description of the operation of the power transmission mechanism will make the operation clear, and a brief description will now be given of the method of connecting the implement to the tractor and of disconnecting the same therefrom.

It will be understood that the implement when detached from the tractor will rest on the ground with the frame supporting members 40 extending rearwardly. In order to connect the tractor thereto, the lever 105 should be manipulated in a manner to cause the hinged frame 30 to assume its lowest position. When this has been done, the tractor should be propelled under its own power to a position in which the sockets 34 register with the rearwardly extending frame supporting members 40 of the implement. The tractor should then be again driven forwardly, whereupon the sockets 34 will be forced on to the supporting members 40, latches 37 or 50, as the case may be, automatically retaining the supporting members in the sockets when the supporting members have reached their rearmost position. When the implement has thus been attached to the tractor and the shaft 65 has been connected to the shaft 67 by the coupling 66 in any suitable manner, the binding machine is ready for operation, and by manipulating the lever 105 the harvester or other implement may be vertically adjusted to the desired position. In order to disconnect the implement from the tractor, the hinged frame should be lowered and then the operator should pull rearwardly on the flexible connections 46, whereupon the latches 37 will be released from the supporting members 40, and the tractor may be withdrawn from the supporting members.

From the above specification it will be seen that a simple and practical construction has been provided by means of which an agricultural implement may be operatively propelled and driven from a tractor, and a construction in which the weight of the implement has been reduced to a minimum, and by means of which the implement may be adjusted by power to the desired position for operation. Attention is also directed to the fact that the same power transmission shaft is utilized for driving the operative elements on the implement and for transmitting power to the driving connections which control the raising and lowering of the implement.

While the above specification describes certain embodiments of improvements, it should be understood that the invention is capable of further modification, and that modifications and changes in the construction and arrangement of the cooperating parts may be made without departing from the spirit and scope of the invention, as expressed in the following claims.

1. In combination, a motor propelled vehicle having a source of power, an implement supported thereon and having operative elements, a drive shaft operatively connected to said source of power, reversible power transmission mechanism operatively connected to said drive shaft for vertically adjusting said implement, and means operatively connected to said drive shaft for driving the operative elements on said implement.

2. In combination, a vehicle having a frame, a hinged frame pivotally connected to said vehicle frame, an implement having supporting members projecting outwardly therefrom, and means carried by the hinged frame for latching said supporting members thereto.

3. In combination, a vehicle having a frame, a hinged frame pivoted thereto, means for raising and lowering said hinged frame, socket members carried by said hinged frame and having latching means pivoted thereto, an implement having outwardly projecting supporting members adapted to engage said socket members and be retained therein by said latching means.

4. In combination, a vehicle having a frame and a source of power carried thereby, a drive shaft operatively connected to said source of power, a hinged frame pivoted to said vehicle, a shaft carried by said hinged frame, flexible connections between said shaft and said vehicle frame and operative connections between the shaft carried by said pivoted frame and the shaft connected to said source of power, whereby the said flexible connections may be lengthened or shortened.

5. In combination, a vehicle having a source of power, a shaft operatively connected to said source of power, an implement adapted to be detachably connected to said vehicle and having operative elements, a sleeve rotatably mounted on said shaft, power transmission mechanism between said shaft and said sleeve whereby said sleeve may be rotated in either direction, means operatively connected to said sleeve for raising and lowering said implement on said vehicle and means operatively connected to said shaft and to the operative elements on said implement for driving said operative elements.

6. In combination a motor vehicle having a frame, a power unit mounted thereon, means connected to the power unit to propel the vehicle, a supplemental frame pivotally connected at one end to the vehicle frame, connecting means on the other end of the supplemental frame detachably supporting an implement having operative elements, drive connections between the power unit and the operative elements, and drive connections between the power unit and supplemental frame adapted to raise and lower the supplemental frame.

7. In a motor vehicle, the combination of a main frame, an engine thereon, traction means driven from the engine to propel the vehicle, a supplemental frame pivoted to the main frame at one end and adapted for detachable connection to an implement at the other end, a transverse shaft journaled on one of the frames, connecting members between the shaft and other frame, reversible driving connections between the shaft and engine, whereby the shaft may be rotated in opposite directions to raise or lower the supplemental frame.

8. In a motor vehicle, the combination of a main frame, an engine thereon, traction means driven from the engine to propel the vehicle, a supplemental frame pivoted to the main frame at one end and adapted for detachable connection to an implement at the other end, a transverse shaft journaled on one of the frames, means connecting each end of the shaft to the other frame, reversible driving connections between the shaft and engine, whereby the shaft may be rotated in opposite directions to raise or lower the supplemental frame.

9. In a motor vehicle, the combination of a main frame, an engine thereon, traction means driven from the engine to propel the vehicle, a supplemental frame pivoted to the main frame at one end and adapted for detachable connection to an implement at the other end, a transverse shaft journaled on one of the frames, a flexible member connected to each end of the shaft and to the other frame, reversible driving connections between the shaft and engine, whereby rotation of the shaft in opposite directions will wind the flexible members thereon or therefrom to raise or lower the supplemental frame.

10. In a motor vehicle, the combination of a main frame, an engine thereon, traction means driven from the engine to propel the vehicle, a supplemental frame pivotally connected to the main frame at one end and adapted for detachable connection to an implement at the other end, a transverse shaft journaled on one of the frames, connecting members between the shaft and other frame, reversible gearing operatively connected to the shaft, a clutch adapted to connect the gearing to the engine to drive the shaft in opposite directions, whereby the supplemental frame may be raised or lowered.

11. In a motor vehicle, the combination of a main frame, an engine thereon, traction means driven from the engine to propel the vehicle, a supplemental frame pivoted to the main frame at one end, an implement carried by the supplemental frame at its other end, a transverse shaft journaled on one of the frames, means connecting the shaft to the other frame, reversible driving connections between the shaft and engine whereby the shaft may be rotated in opposite directions to raise or lower the supplemental frame and implement.

12. In a motor vehicle, the combination of a main frame, an engine mounted thereon, traction means driven from the engine for propelling the vehicle, an implement having rearwardly projecting supporting members, a supplemental frame pivoted at its rear end to the main frame and at its forward end having connecting means receiving the implement supporting members, and means for detachably connecting the supporting members to the connecting means.

13. In a motor vehicle, the combination of a main frame, an engine mounted thereon, traction means driven from the engine for propelling the vehicle, an implement having rearwardly projecting supporting members, a supplemental frame pivoted at its rear end to the main frame and at its forward end having connecting means receiving the implement supporting members, means for detachably connecting the supporting members to the connecting means, and means driven from the engine for raising and lowering the supplemental frame and implement about the pivotal connection.

14. In a motor vehicle, the combination of a main frame, an engine mounted thereon, traction means driven from the engine for propelling the vehicle, an implement having rearwardly projecting supporting members, a supplemental frame pivoted at its rear end to the main frame and at its forward end having connecting means receiving the implement supporting members, means for detachably connecting the supporting members to the connecting means, a transverse shaft journaled on one of the frames, means connecting the shaft and other frame, means driven from the engine for rotating the shaft in opposite directions, whereby the supplemental frame and implement may be raised or lowered with respect to the main frame.

15. In a motor vehicle, the combination of a main frame, an engine mounted thereon, traction means driven from the engine for propelling the vehicle, an implement having a pair of rearwardly extending supporting arms, a supplemental frame pivotally supported at its rear end on the main frame and at its forward end having a pair of sockets receiving the supporting arms, means for detachably securing the arms in the sockets, and means driven from the engine for raising and lowering the supplemental frame and implement about the pivotal connection.

16. In a motor vehicle, the combination of a main frame, an engine mounted thereon, traction means driven from the engine for propelling the vehicle, an implement having a pair of rearwardly extending tapered supporting arms, a supplemental frame pivotally supported at its rear end on the main frame and at its forward end having a pair of flaring sockets receiving the supporting arms, means for detachably securing the arms in the sockets and means for raising and lowering the supplemental frame and implement about the pivotal connection.

17. In a motor vehicle, the combination of a main frame, an engine mounted thereon, traction means driven from the engine for propelling the vehicle, an implement having a pair of rearwardly extending tapered supporting arms with a notch near the rear end of each, a supplemental frame pivotally supported at its rear end on the main frame and having a pair of forwardly flaring sockets receiving the supporting arms, and a latch member on each socket engaging in the notches in the respective arms to secure the implement to the supplemental frame.

In testimony whereof we affix our signatures.

BERT R. BENJAMIN.
WILLIAM WEBBER.
CHARLES PEARSON.